United States Patent [19]

van der Lely

[11] 4,343,481
[45] Aug. 10, 1982

[54] COMPOSITE TANK FOR TRANSPORTING LIQUID

[76] Inventor: Cornelis van der Lely, 7 Brüschenrain, Zug, Switzerland

[21] Appl. No.: 147,067

[22] Filed: May 5, 1980

[30] Foreign Application Priority Data

May 14, 1979 [NL] Netherlands ............... 7903760

[51] Int. Cl.³ ................................. B60P 3/24
[52] U.S. Cl. ................................. 280/5 C; 280/5 F
[58] Field of Search ............... 280/5 C, 5 F, 5 R; 220/20, 22, 5 A, 23.2, 23.83

[56] References Cited

U.S. PATENT DOCUMENTS

| 2,503,792 | 4/1950 | Brandon | 220/5 A |
| 2,558,168 | 6/1951 | Bernstein | 280/5 C |
| 2,780,369 | 2/1957 | Kaney | 280/5 C |

FOREIGN PATENT DOCUMENTS

| 219997 | 7/1961 | Austria | 280/5 C |
| 556612 | 4/1957 | Belgium | 280/5 C |
| 465226 | 5/1950 | Canada | 280/5 C |
| 133768 | 12/1959 | U.S.S.R. | 280/5 C |

Primary Examiner—Joseph F. Peters, Jr.
Assistant Examiner—Donn McGiehan
Attorney, Agent, or Firm—William B. Mason

[57] ABSTRACT

A tank for transporting liquid, in the composite, is constructed of three tank parts, two of which are elongated cylindrical tanks inclined downwardly to the rear at about 4.5° and are spaced apart a short distance. At the rear, the two tanks connect rigidly with a further third cylindrical shorter tank also inclined to the rear, such third tank being supported by a set of wheels and having its lower side at about the center line of the two forward tanks. The third tank is connected to one of the other tanks to provide between them a common tank space. There are thus two contiguous tank spaces, one in an elongated forward tank and another in the other elongated forward tank and the rear tank. A coupling plate is provided forwardly on the two front elongated tanks for connection to a tractor for trailers and conduits extend in front of the tanks for connection to an air pressure pump on the tractor or forward part of the tank which may provide either positive or negative pressure in the interior spaces of the tanks. At the rear of the tanks conduits lead from the lower parts of the forward elongated tanks to behind the third tank and also auxiliary conduits extend laterally outwardly from the rear of the forward elongated tanks, which also provide some protection at the lowest part of such tank should they contact the underlying surface during transportation. The same elongated forward tank which connects to the interior of the third tank also has its conduit to the rear connected into the bottom of the third tank to insure complete drainage therefrom.

13 Claims, 3 Drawing Figures

COMPOSITE TANK FOR TRANSPORTING LIQUID

SUMMARY OF THE INVENTION

The invention relates to a composite tank for transporting liquid material having at least one set of supporting wheels.

According to the invention, at least two tanks extending parallel in the direction of travel are arranged on the set of supporting wheels with their longitudinal axes at an angle to the horizontal plane. This construction permits the convenient and effective emptying of the composite tank. Moreover, the center of gravity of the composite tank is thus located at a relatively low level.

According to the invention a further construction of the composite tank for transporting liquid material having at least one set of supporting wheels, comprises at least two like elongated tank parts which are separated from one another in the direction of length. In this way, particularly when driving around curves, road stability is improved. Moreover, when the tank parts are not completely filled, the center of gravity of the composite tank and the location of the liquid is such that it cannot shift in place in a direction significantly transverse to the composite tank's direction of length to an extent such that road stability is adversely affected in an undesirable manner. An advantageous construction of the composite tank according to the invention is obtained when the two tank parts are located on both sides of a vertical plane containing the longitudinal center line of the composite tank.

According to a further aspect of the invention the composite tank for transporting liquid material having at least one supporting wheel set has at least two substantially cylindrical tanks connected with a third, substantially cylindrical tank. An advantageous construction is thus obtained by the relative disposition of the three tanks. The third tank is rigidly connected with the first two tanks, is arranged behind them and is coupled with the set of supporting wheels. Therefore, the two first tanks are arranged, at least in part, at a low level so that the composite tank's center of gravity is also at a low level, which considerably improves its road stability. An improvement in road stability is further achieved when a top side of a portion of the composite tank is located at a lower level than another portion of the composite tank, both portions arranged whereby they are supported by the same wheel set.

Other objects, adaptabilities and capabilities of the invention will appear as the description progresses, reference being had to the accompanying drawings, in which:

DESCRIPTION OF THE PREFERRED EMBODIMENT

Figure 1:
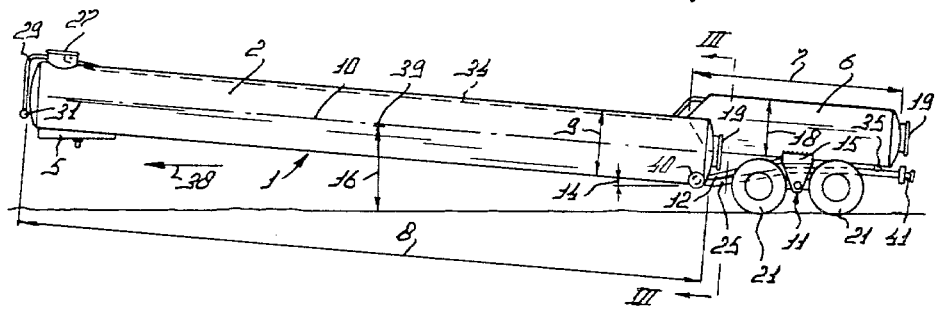
FIG. 1 is a side elevation of a composite tank in accordance with the invention.
Figure 2:
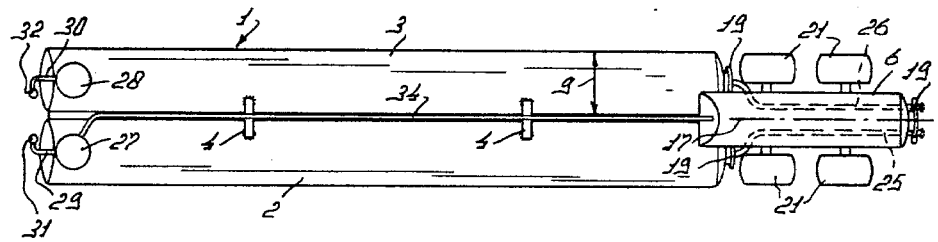
FIG. 2 is a plan view of the composite tank of FIG. 1 in the direction of the arrow II in FIG. 1.
Figure 3:
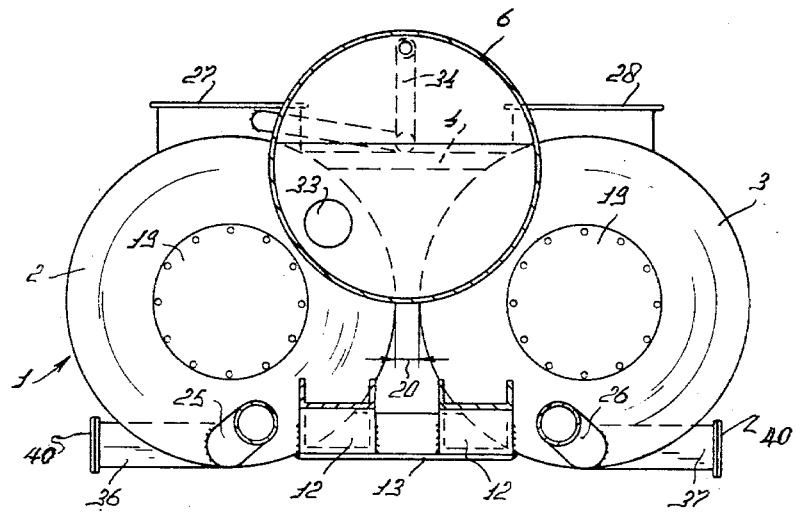
FIG. 3 is an enlarged sectional view of the composite tank taken on the line III—III in FIG. 1.

The composite tank according to the invention shown in the Figures is constructed in the form of a trailer which can be hitched to a vehicle such as a trailer tractor. The embodiment of a composite tank 1 according to the invention shown here comprises two tank parts which are elongated tanks 2 and 3 coupled with one another by coupling strips 4 evenly distributed over a given length. Near the front side of the composite tank, viewed with respect to the normal direction of movement 38, tanks 2 and 3 are intercoupled by a coupling plate 5. Coupling plate 5 is constructed in the form of a hitch to be connected with a prime mover (not shown in detail in the drawings). The rear sides of tanks 2 and 3, viewed with respect to the normal direction of travel 38, are coupled with one another by a third cylindrical tank part which is a tank 6.

Third tank 6 has a length 7, which is considerably shorter than the length 8 of tanks 2 and 3 having equal lengths. The length of tank 6 is about four meters, whereas length 8 of tanks 2 and 3 is about eleven meters. Consequently the length of tanks 2 and 3 is 2.5 to 3-times length 7 of tank 6. Tank 6 is lying with its front end on and between the rear ends of the tanks 2 and 3. The rear ends of tanks 2 and 3 and the front end of tank 6 are shaped to conform to one another and are connected together. Tanks 2 and 3 have equal diameters preferably about 1.10 meters and are of a cylindrical shape. Tank 6 also has a cylindrical shape and a diameter 18, which is smaller than the diameters of tanks 2 and 3. In this embodiment diameter 18 preferably is about ninety centimeters.

Beneath the middle of length 7 of tank 6 is arranged a set of wheels 11 fastened to a bridge 15, which is connected with tank 6. This wheel set comprises two tandem axles having four wheels 21.

Tanks 2, 3 and 6 have uniform cross-sections throughout their lengths and have straight longitudinal axes 10 and 17 which are in parallel relationship. Tanks 2, 3 and 6 are each inclined downwardly to the rear in the usual transport position shown in the drawings at an angle 14 of about 4.5° to a horizontal plane. The rear ends of tanks 2 and 3 are connected, in addition to their connection to wheel set 11, by beams 12, which are coupled with bridge 15 and with a tie plate 13 arranged between the rear ends of tanks 2 and 3. Wheel set 11 is located completely behind tanks 2 and 3. As a whole tank 6 is located at a height so that its lower side is located in a plane containing the longitudinal center lines 10 of tanks 2 and 3. With this connection of tanks 2 and 3 to tank 6 and the connection of wheel set 11 with tank 6, the rear ends of tanks 2 and 3 are located on their bottom side at a height equal to that of the center of wheels 21 of wheel set 11. With this construction the center of gravity 39 of the composite tank trailer is located at a distance 16 of about 1.50 meters above the ground. Tanks 2 and 3 are located at equal heights one on each side of the vertical plane going through the longitudinal center line 17 of the composite tank. Tanks 2 and 3 are completely separated from one another along their lengths and are preferably spaced apart by a distance 20 of a few centimeters, for example, five centimeters in the embodiment shown. Viewed in plan, tank 6 is located midway between tanks 2 and 3, its center line 17 being located in a vertical plane which, extended, bisects the space between tank 2 and 3. Wheel set 11 is disposed so the outer sides of wheels 21 on both sides of the trailer are spaced apart by a distance substantially equal to the overall width of composite tank 1. (FIG. 1).

Each of tanks 2 and 3 is provided with a respective pipe 25 and 26. These pipes extend from the after bottom ends of tanks 2 and 3 along the bottom side of the tank 6 to the rear so that their outlets 41 are located at the rear of tank 6 (FIG. 1).

Each of tanks 2 and 3 has on the top side of its higher front end a respective dome 27 and 28 with which conduits 29 and 30 respectively are connected. These conduits extend downwards in front of tanks 2 and 3 and are provided with cocks 31 and 32, respectively. Conduits 29 and 30 are coupled with one or two pumps, which are preferably vacuum pressure pumps so that by these pumps air can be conveyed into and evacuated from the tanks through said conduits. Preferably conduits 29 and 30 are coupled with the same pump, there being arranged cocks between the pump and conduits 29 and 30 in a manner so that optionally either one or the other tank can be coupled with the pump or, if desired, both tanks can be simultaneously coupled with the pump. This is not shown in detail in the drawings.

Tanks 6 and 2 communicate with each other through an opening 33 so that the space of tank 2 is in communication with the space of tank 6. A further communication between tank 6 and tank 2 is formed by a conduit 34 extending between the highest part of tank 6 and dome 27 of tank 2. The lowermost part of tank 6 at the rear thereof is coupled with pipe 25 of tank 2 through a vertically disposed connection pipe 35. Tanks 6 and 2 thus constitute common tank space which is completely separated from the space in tank 3. Thus composite tank 1 has two completely separate tank spaces, tanks 2 and 6 having a common tank space and tank 3, the space of each having a vacuum-pressure conduit to be connected with a pump and an outlet or inlet pipe, respectively, such as pipes 25 and 26, respectively.

Near the lowermost parts at their rear ends, the tanks are provided with auxiliary outlets 36 and 37, respectively, which are closed by covers 40. It will be appreciated that outlets 36 and 37, and covers 40 also function to protect or screen the lowermost aspects of tanks 2 and 3 from undue damage from obstruction and bumps in the roadway. Tanks 2, 3 and 6 have each near their rear ends in the center a manhole closed by a manhole plate 19.

The tank according to the invention, one embodiment of which is shown in the Figures, is suitable for transporting fluids having a specific gravity about equal to that of water as well as fluids having an appreciably higher specific gravity than water, for example, a specific gravity five times that of water. The composite tank constructed in the form of a trailer has a shape and design to provide improved road stability, particularly, in making turns. By providing the composite tank with two completely separate tank parts, in this embodiment two separate tanks, located one on each side of the longitudinal center line of the trailer wagon, the center of gravity of the composite tank including its cargo cannot shift transversely any considerable amount. Thus the road stability, particularly in turns, is materially improved. The center of gravity of the composite tank is located at a low level owing to the downwardly inclined tanks 2 and 3 and to the coupling of these two tanks with the higher tank 6 arranged on wheel set 11. Thus a substantial portion of tanks 2 and 3 is located at a lower level than the top side of wheels 21. By fastening the two tanks 2 and 3 to extend in the direction of travel through the connection of the third tank 6 to the wheel set 11, a substantially maximum total capacity of tanks 2, 3 and 6 results considering limitations on dimensions and weight. Moreover, by arranging only one tank 6 at the rear ends of tanks 2 and 3 with tank 6, viewed in plan, located midway of the width of the composite tank, the center of gravity of the composite tank is located as near as possible the center line of the composite tank.

When tanks 6 and 2 are not completely filled, the empty spaces of tanks 6 and 2 are in the upper parts of tanks 6 and 2 so that the center of gravity of the total load of the composite tank is located at the lowest possible level. In the rearwardly inclined tank 3, material also accumulates in its lowermost rear part when it is not completely filled. Thus the center of gravity of an incompletely filled composite tank is substantially nearer to the wheel set 11 than to coupling plate 5 which is conducive to the assembly's good road stability.

Owing to the inclined position of the tanks, material therein is readily discharged through pipes 25 and 26, respectively, which communicate with the lowermost parts of the tanks. Material may also be evacuated from the tanks by pumping air under pressure therein through conduits 29 and 30. In a similar manner, the tanks may be filled by evacuating air therefrom through the conduits 29 and 30, respectively. Openings 41 of pipes 25 and 26 are adapted to be connected with hoses for introducing fluid into, or for emptying, the tank.

The center of gravity of the composite tank is held at a low level because large portions of tanks 2 and 3 have their highest levels located lower than the highest level of the third tank 6. For cleaning purposes the tanks are accessible through the manholes 19. Auxiliary outlets 36 and 37 are employed for the discharge of residual material from the tanks. For this purpose, covers 40 are removed from auxiliary outlets 36 and 37.

The overall capacity of tanks 2, 3 and 6 is about 25,000 liters and each tank preferably has a diameter of at least substantially one meter.

The higher or, in other words, the forward part of the tank trailer is adapted to be coupled with the coupling member of a tractor for moving composite tank 1 along the road. By connecting the highest portion of the composite tank with the prime mover satisfactory road stability results. The composite tank's center of gravity is so located whereby wheel set 11 effectively absorbs many forces produced during transport. Because pipes 25 and 26 extend from the bottom sides of the tanks to the rear slightly towards the center line 17, mouths 41, are thus located near center line 17 and can be readily connected on both sides of the wagon with inlet and outlet conduits respectively.

Although the preferred embodiment of the invention has been described, it is to be understood that it is capable of other adaptations and modifications within the scope of the appended claims.

Having thus described my invention, what I claim as new and desire to secure by Letters Patent of the United States is:

1. A composite tank for transporting liquid material comprising one set of wheels, first and second tanks extending in the direction of travel from proximate said set of wheels, said first and second tanks located at a lower level than the upper aspect of a third tank in the vicinity of said set of wheels, said third tank being arranged on said set of wheels; said set of wheels being arranged substantially beneath, the middle of the length of said third tank.

2. A composite tank as claimed in claim 1, wherein said two tanks are located one on each side of a vertical plane containing the longitudinal center line of the composite tank.

3. A composite tank as claimed in claim 2, wherein said two tanks are substantially cylindrical in configuration.

4. A composite tank as claimed in claim 3, which is provided at its front with a coupling member adapted to connect it to a prime mover, said set of wheels being located behind the two tanks and said two tanks being inclined downwardly to the rear.

5. A composite tank as claimed in claim 1, wherein the lowermost parts of said first and second tanks are each provided with an auxiliary outlet connected to the respective lowermost part, pipes for communication with said first and second tanks connected to the respective lowermost part of each said first and second tank near the connection of said respective auxiliary outlet.

6. A composite tank as claimed in claim 1, wherein the center of gravity of the composite tank is located at a height of about 1.50 meters above the ground.

7. A composite tank as claimed in claim 1, wherein the lowermost part of the composite tank is at a lower level than the top of the wheels of said set of wheels.

8. A composite tank as claimed in claim 1, wherein said third tank is coupled through a passageway with said first or said second tanks to comprise a separate space.

9. A composite tank for transporting material comprising at least one set of wheels arranged to support said tank, said tank including at least two substantially cylindrical tanks and a third substantially cylindrical tank, said two tanks being connected with said third tank and said set of wheels being arranged at said third tank, the longitudinal axis of said third tank being substantially in parallel relationship with the longitudinal axes of said two tanks and substantially midway between said axes of the two tanks, as seen in plan, said third tank being located substantially entirely above the longitudinal axes of said two tanks and to the rear thereof.

10. A composite tank as claimed in claim 9, wherein said third tank has a diameter which is substantially about the same as said two tanks.

11. A composite tank as claimed in claim 9, wherein the uppermost aspect of said two tanks at their rear portions is substantially at the same level as the lowermost aspect of said two tanks at their front portions.

12. A composite tank for transporting liquid material comprising one set of wheels, a first and second tank extending in the normal direction of travel from a third tank proximate said set of wheels, said first and second tanks being located at a lower level than the upper aspect of said third tank in the vicinity of said set of wheels, the lowermost aspect of said first and second tanks having respective conduits therefrom which extend along said set of wheels to the rear, each said conduit being separated from the other and extending to the rear from the corresponding first or second tank adjacent said set of wheels, one of said tanks being coupled by fluid passage means with said third tank and said third tank communicating through a passage with that tank having said fluid passage means, said third tank being fastened at its front to the rear of said first and second tanks.

13. A composite tank as claimed in claim 12, wherein said first or second tank which does not communicate with said third tank through said passage is completely separated from said other tanks.

* * * * *